United States Patent
Miller et al.

(10) Patent No.: US 12,284,440 B1
(45) Date of Patent: Apr. 22, 2025

(54) SYSTEMS AND METHODS FOR TRIGGERING A FRAME CAPTURE IN A WEARABLE DEVICE

(71) Applicants: Brett D. Miller, San Carlos, CA (US); Branko Petljanski, San Jose, CA (US); Kathrin Berkner Cieslicki, Los Altos, CA (US); Noah D. Bedard, Los Gatos, CA (US); Andrew Kenneth John McMahon, San Carlos, CA (US)

(72) Inventors: Brett D. Miller, San Carlos, CA (US); Branko Petljanski, San Jose, CA (US); Kathrin Berkner Cieslicki, Los Altos, CA (US); Noah D. Bedard, Los Gatos, CA (US); Andrew Kenneth John McMahon, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 17/934,295

(22) Filed: Sep. 22, 2022

Related U.S. Application Data (60) Provisional application No. 63/261,636, filed on Sep. 24, 2021.

(51) Int. Cl.
*H04N 23/68* (2023.01)
*H04N 7/18* (2006.01)
*H04N 23/65* (2023.01)

(52) U.S. Cl.
CPC ........... *H04N 23/684* (2023.01); *H04N 7/188* (2013.01); *H04N 23/651* (2023.01); *H04N 23/6812* (2023.01)

(58) Field of Classification Search
None
See application file for complete search history.

(56) References Cited

U.S. PATENT DOCUMENTS

| | | | |
|---|---|---|---|
| 2006/0219861 A1* | 10/2006 | Wood | H04N 25/709 348/E3.02 |
| 2015/0181117 A1* | 6/2015 | Park | H04N 23/62 348/372 |
| 2016/0360160 A1* | 12/2016 | Eizenberg | H04N 23/661 |
| 2018/0004275 A1* | 1/2018 | Tubbs | G06F 1/3287 |
| 2019/0014242 A1* | 1/2019 | Piekarski | H04N 23/51 |
| 2019/0208123 A1* | 7/2019 | Kawabata | H04N 23/65 |
| 2019/0295213 A1* | 9/2019 | Price | A63F 13/25 |
| 2019/0387168 A1* | 12/2019 | Smith | G06F 1/1686 |

(Continued)

FOREIGN PATENT DOCUMENTS

WO WO-2022155747 A1 * 7/2022

*Primary Examiner* — Paul M Berardesca
(74) *Attorney, Agent, or Firm* — Blank Rome LLP (57) ABSTRACT

Frame capture techniques may include obtaining, from at least one sensor, sensor data indicating a motion rate of the system in the environment, receiving a request for the image data of the environment, and selecting, by the controller, a frame rate based on one or more requesting client applications and the sensor data. In addition, the frame tracking techniques may include detecting, based on a motion parameter in the sensor data and by the controller, that a motion of the system falls below a predetermined threshold; and triggering frame capture by the camera in accordance with the sensor data and the selected frame rate, the frame capture being triggered in accordance with the request and the detection.

20 Claims, 8 Drawing Sheets

(56) References Cited

U.S. PATENT DOCUMENTS

| | | | |
|---|---|---|---|
| 2020/0084387 A1* | 3/2020 | Baldwin | H04N 5/33 |
| 2021/0027590 A1* | 1/2021 | Lin | G06T 7/11 |
| 2021/0096632 A1* | 4/2021 | Kosugi | G06F 1/3215 |
| 2023/0042900 A1* | 2/2023 | Young | H04N 23/74 |
| 2024/0251159 A1* | 7/2024 | Grundhoefer | H04N 23/61 |

* cited by examiner

SYSTEMS AND METHODS FOR TRIGGERING A FRAME CAPTURE IN A WEARABLE DEVICE

BACKGROUND

This disclosure relates generally to the field of machine vision technology in wearable devices, and more specifically to the field of variable frame capture in a wearable device.

Frame capture is a process undertaken by devices equipped with machine vision technology. Capturing a given frame depends on the power required for the frame to be collected, the power available for collection of the frame, and the motion of the camera itself. Wearable devices perform frame collection at a specific frame rate with predetermined resolution and power consumption. In some cases, the frames collected by these wearable devices lack a sharpness that would allow for image features to be extracted for a particular application.

Power availability in wearable devices that collect frames can be constrained due to limited battery capacity. As a result, frames cannot be collected in these devices for extended periods of time.

The motion of wearable devices can also impact the sharpness of resulting images. In particular, a capturing device can cause resulting images to include a blur, which may affect the performance of requesting clients, such as object detection, device tracking, and the like.

DETAILED DESCRIPTION

This disclosure is directed to systems, methods, and computer readable media for triggering a frame capture in a wearable device and providing the resulting image data to requesting clients. In some embodiments, techniques are disclosed for determining an optimal frame capture rate for a camera in the wearable device based on one or more specific frame capture requests, such as a particular client or service for which the image data is requested. In one or more embodiments, the camera captures a frame that satisfies a sharpness metric (i.e., a sharpness of an image or a pertinent portion of an image), and/or improving power consumption of the wearable device. As a result, the camera may perform frame collection at a variable frame rate that allows variable power consumption during frame capture. In some embodiments, the frames collected by the camera may be sufficiently sharp to allow for use of the image data by requesting clients. That is, the systems, methods, and computer readable media improve power consumption in a wearable device while collecting frames allowing for image data to be obtained (e.g., frames with both a high sharpness and a high resolution). As a result, frames may be collected for extended periods of time.

In addition, the disclosure is related to a technique for optimizing the triggering the frame capture, for example, based on a requesting client or a combination of requesting clients. For example, a particular level of sharpness may be necessitated for a particular requesting client. Embodiments described herein monitor motion data to determine when to trigger image capture such that the resulting image is more likely to satisfy the required sharpness metric. Moreover, in some embodiments, a controller may manage incoming requests from multiple clients. The controller may trigger the image capture and provide an image buffer to all requesting devices, or may coalesce requests, such that the captured images during a single capture event satisfy required sharpness metrics for multiple clients.

According to one or more embodiments, the wearable device is a watch or a headset that may be worn by a user interacting with a physical environment. The wearable device may include one or more sensors, which may track force, acceleration, acoustic signal (e.g., generated by the user interacting with the physical environment), and the like, for an object to which the sensor is attached. In one or more embodiments, the wearable device may be worn, for example, on the head, an arm, a wrist, or otherwise on the user. In one or more embodiments, the wearable device includes the camera that is operably connected to the at least one sensor. In this disclosure, "operably connected" refers to any connection that allows the camera to exchange control information with the one or more sensors. As such, the camera and the sensor may or may not be collocated on a single device.

The camera may be configured to perform the frame capture at a rate that is determined based on sensor data collected by the one or more sensors. For example, the frame capture may be triggered in accordance with a frame rate and/or sharpness metric selected based on one or more requesting client applications and the sensor data. In one or more embodiments, performing the frame capture in accordance with the frame rate selected allows the system to manage power consumption, such as by maintaining a reduced power consumption. This is possible despite battery capacity limitations and always-on operations in some wearable devices, because frame capture is performed when the sensor data indicates that frames should be collected. For example, if a motion sensor tracks the motion of a device, frame capture may occur when the sensor indicates that the device has stopped or motion is reduced to a speed so as to prevent or reduce motion blur in the captured frames.

In some embodiments, power consumption is reduced by minimizing the time the camera is actively capturing frames (and, thus, performing in a high- or higher-power mode). This may happen at multiple levels in the system. For example, camera-based motion tracking algorithms (i.e., VIO, or visual-inertial odometry) may adapt their frame rate based on the motion of the device. Low motion of the device may require lower frame rates to maintain suitable performance.

In some embodiments, rather than operating the camera in a continuous, constant frame rate sampling mode, the camera and the sensor may run in a triggered capture mode instead, whereby frames may be captured upon request and allowing the system to drop into a low-power or idle state between capture events. In this regard, multiple frame clients (e.g., frame client applications or devices separate from the camera and/or the sensor) may communicate to a controller to arbitrate, coalesce multiple frame requests, control the exact timing of captures, and make resulting frame buffers available to clients.

Further, the camera may be triggered to capture image data based on sensor data to produce images with a suitable sharpness metric for one or more requesting applications. In one or more embodiments, the motion blur present in any given frame is minimized when the controller relies on the sensor data to adjust a timing of the frame capture events to occur during periods of relatively low motion, or at during a motion which is predicted to produce suitable image data. For example, a reduction in motion blur may be beneficial for computer vision algorithms. In some embodiments, a sharpness metric for an image captured during a particular motion may be predicted, for example, using reference data, a rule set, a trained network, or the like. Accordingly, by triggering image capture at times when a sharpness is predicted to be a suitable level and/or when a motion is at a suitable level, performance of requesting clients, such as machine vision algorithms, may be improved or optimized.

In the following description, for purposes of explanation, numerous specific details are set forth to provide a thorough understanding of the disclosed concepts. As part of this description, some of this disclosure's drawings represent structures and devices in block diagram form to avoid obscuring the novel aspects of the disclosed embodiments. In this context, it should be understood that references to numbered drawing elements without associated identifiers (e.g., 100) refer to all instances of the drawing element with identifiers (e.g., 100*a* and 100*b*). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "lens" refers to a lens assembly, which could include multiple lenses. In one or more embodiments, the lens may be moved to various positions to capture images with different focal points. Further in one or more embodiments, the lens may refer to any kind of lens, such as a telescopic lens or a wide-angle lens. As such, the term lens can mean a single optical element or multiple elements configured into a stack or other arrangement.

For purposes of this disclosure, the term "camera system" refers to one or more lens assemblies along with the one or more sensor elements and other circuitry utilized to capture an image. For purposes of this disclosure, the "camera" may include more than one camera system, such as a stereo camera system, multi-camera system, or a camera system capable of sensing the depth of the captured scene.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Figure 1:
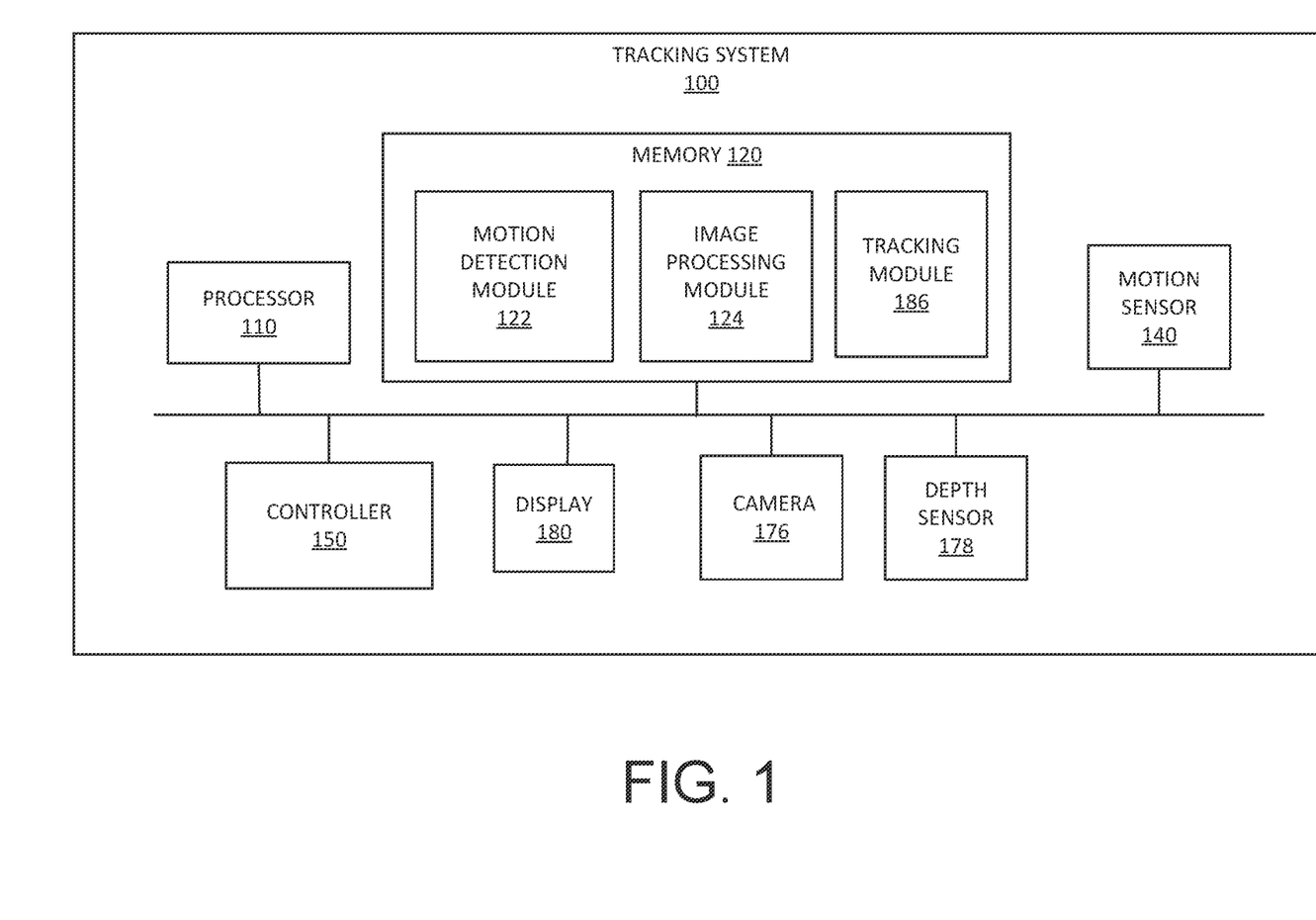
FIG. 1 shows, in block diagram form, a simplified system diagram in accordance with one or more embodiments.

Referring to FIG. 1, a simplified block diagram of a tracking system 100 is depicted, in accordance with one or more embodiments of the disclosure. Tracking system 100 may include, and/or be part of, a multifunctional device, such as a mobile phone, tablet computer, personal digital assistant, portable music/video player, wearable device such as a head-mounted device, base station, laptop computer, desktop computer, network device, or any other electronic device. Examples of tracking system 100 include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. Display 180 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively.

According to one or more embodiments, the tracking system 100 is capable of providing motion detection from a motion sensor 140, such as an inertial measurement unit ("IMU") sensor, or other sensor that detects movement. Motion sensor 140 may detect a change in inertia that indicates a motion event. In this regard, motion parameters may be tracked using sensor data and thresholds associated with these motion parameters may indicate the motion event has occurred. Tracking system 100 may include controller 150. In some embodiments, controller 150 may be separate from tracking system 100 and may be communicate with tracking system 100 across a network, a wired connection, or a wireless short-range connection, among others. For example, in some embodiments, controller 150 may be a smart accessory, such as a smart watch worn on a user's wrist or arm, a smart headset device worn on the user's head, a smart hearing device worn on the user's ear, or any other electronic device that includes the motion sensor from which at least some motion may be determined.

Tracking system 100 may include a processor 110, such as a central processing unit (CPU). Processor 110 may be a system-on-chip such as those found in mobile devices and include one or more dedicated graphics processing units (GPUs). Further, processor 110 may include multiple processors of the same or different type. Tracking system 100 may also include memory 120. Memory 120 may include one or more different types of memory, which may be used for performing device functions in conjunction with processor 110. For example, memory 120 may include cache, ROM, RAM, or any kind of transitory or non-transitory computer readable storage medium capable of storing computer readable code. Memory 120 may store various programming modules for execution by processor 110, including motion detection module 122 and image processing module 124.

Tracking system 100 may include at least one camera 176 or other sensors, such as depth sensor 178, from which depth of a scene may be determined. In one or more embodiments, camera 176 may be a traditional RGB camera, a depth camera, or other camera device by which image information may be captured. Further, camera 176 may include a stereo or other multi-camera system, a time-of-flight camera system, or the like which capture images from which depth information of a scene may be determined. Tracking system 100 may include a tracking module 186 that is configured to collect image data. Memory 120 may also include tracking module 186, which may be configured to regulate frame collection in real-time. The tracking module 186 may monitor and control frame capture requests, for example, from image processing module 124 and/or controller 150. Tracking module 186 may organize and index a ledger of all frame capture requests over a period of time.

In one or more embodiments, motion detection module 122 may determine when the motion event has occurred, as well as characteristics of the motion event. The motion event may indicate that a device has changed from an inertial state. Motion detection module 122 may determine when a change in acceleration occurs, for example, by receiving an indication from controller 150 that the motion event has occurred, and/or by receiving and/or analyzing motion data from motion sensor 140 and/or other sensors, such as camera 176 and depth sensor 178. According to one or more embodiments, motion detection module 122 may utilize additional data to verify that the motion event has actually occurred. For example, motion detection module 122 may obtain depth information from tracking system 100, such as from camera 176 and/or depth sensor 178. As an example, if the depth information indicates through sensor data that the device is not in motion, then the motion detection module 122 may determine that the motion event is a false motion event. In some embodiments, in accordance with a determination that the frame capture event has ceased, camera 176 may be triggered to enter a low power state.

In one or more embodiments, image processing module 124 may manage image data collected by camera 176. According to some embodiments, image processing module 124 may perform image processing techniques, from which characteristics of an image may be determined, such as lighting, sharpness, blur, and the like. According to some embodiments, various levels of blur may occur when frames are captured during a motion event. In some embodiments, frames may be captured if sensor data indicates that frames captured during the motion would likely include images satisfying the predetermined sharpness metric, for example, based on characteristics of the motion and/or characteristics. For example, if the system is moving at high speed when image capture is requested, it may be determined that the current movement of the device would render an unacceptable level of blur in the image (for example, too much blur for object detection or the like). Instead, tracking module 186 may monitor the sensor data to determine when movement characteristics of the tracking system 100 indicate conditions by which an image captured would contain a suitable level of blur for a particular application. In some embodiments, a sharpness metric for an image captured during a particular motion may be predicted, for example, using reference data, a rule set, a trained network, or the like. Accordingly, in some embodiments, when one or more client requests image data, the system may determine, based on the motion data, a suitable frame rate and/or a suitable time at which to trigger an image capture event (i.e., a time at which one or more images are captured).

Although tracking system 100 is depicted as comprising the numerous components described above, in one or more embodiments, the various components may be distributed across multiple systems or devices. Particularly, in one or more embodiments, one or more of the motion detection modules 122, image processing module 124, and tracking module 186 may be distributed differently across multiple devices. Thus, tracking system 100 may not be needed to perform one or more techniques described herein, according to one or more embodiments. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
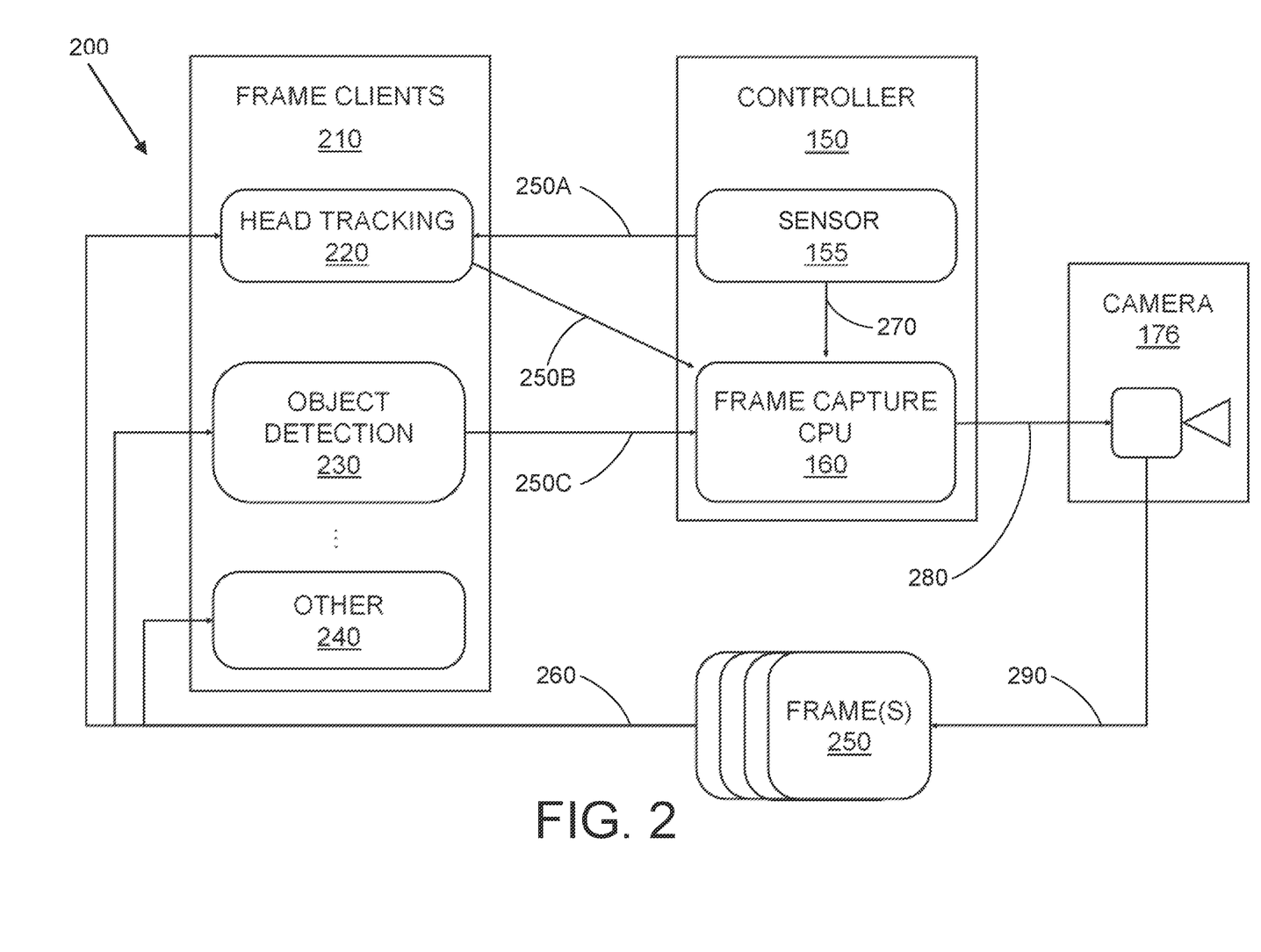
FIG. 2 shows, in block diagram form, a frame capture system that triggers frame captures and distribution in accordance with one or more embodiments.

FIG. 2 illustrates a system for triggering an image capture event in a wearable device in accordance with one or more embodiments. In some embodiments, the system includes various frame clients 210 operably connected to controller 150 and camera 176. Controller 150 and camera 176 may behave in the manner described in reference to FIG. 1. Frame clients 210 may request an image frames 250 to be used for one or more services, such as object detection, machine vision techniques, device tracking, and the like. The image frames 250 may be requested to satisfy a predetermined criterion. The predetermined criterion may be one or more parameters that define a clarity of a collected frame such that an acceptable amount of blur is present for a particular application of the requesting client. These parameters may include a sharpness metric representative of a sharpness level in the image, a noise parameter representative of pixel level variations in the image, a brightness parameter representative of a brightness level in the image, and a contrast parameter representative of a contrast level in the image. One or more predetermined thresholds associated with these parameters may be configured to be a predetermined image type. As another example, the predetermined criterion may additionally, or alternatively, be based on a tolerable level of latency before the image is captured. For example, a client might prioritize receiving an image immediately versus waiting for a low-motion condition that minimizes motion blur.

Frame clients 210 may be configured to request and process frames 250 after they have been collected by camera 176. Frame clients 210 may be located in a same or different housing as controller 150 and camera 176. In some embodiments, frame clients 210 obtain sensor data and image data collected by other devices and present a version of the processed data directly to the user for consumption. Frame clients 210 may include an intermediary application that processes data collected by tracking system 100. Frame clients 210 may include hardware or software to perform processing for head tracking 220, object detection 230, and various other 240 applications, such as computer vision techniques. Head tracking 220 may be configured to monitor a position and movement of the user's head. The position of the head may be tracked by assuming a field of view of the user by matching a field of view of camera 176 to a known head height of the user. Object detection 230 may be configured to identify and distinguish objects in an image or from image data. Object detection 230 may discern a foreground image and a background image in the image data. Other 240 may include applications configured to assess image information from image data.

Controller 150 may include a sensor 155 and a frame capture CPU 160. In one or more embodiments, the collection of image frames 250 may be initiated by establishing a communication link between frame clients 210, controller 150, and camera 176. In some embodiments, frame clients 210 establishes a direct communication link with sensor 155 and frame capture CPU of controller 150 to maintain a continuous exchange of sensor data and/or image data.

In a non-limiting example, head tracking 220 may receive communication 250A with a sensor data from sensor 155. The sensor data may indicate a motion rate or a change in inertia experienced by the sensor 155. Further, the sensor data may include information about an environment surrounding the device (i.e., temperature, altitude, humidity). Simultaneously and as a result of the sensor data, head tracking 220 may send a request 250B for a frame collection to frame capture CPU 160. In some embodiments, frame capture CPU 160 receives sensor feedback information 270 that allow it to determine a frame rate and/or determine a suitable at time at which to trigger frame capture. Frame capture CPU 160 may make this determination in real-time after assessing that sensor feedback information 270 matches image data conditions set forth in request 250B. Then, frame capture CPU 160 generates a trigger 280 to camera 176 which in turn captures a frame or a sequence of frames at a frame rate established in trigger 280 (e.g., capture an image, a sequence of images, a video, or the like).

In another non-limiting example, independent from any sensor data, object detection 230 may send a request 250C for a frame collection to frame capture CPU 160. In some embodiments, frame capture CPU 160 receives sensor feedback information 270 that allow frame capture CPU 160 to determine a frame capture instance with a corresponding frame rate. Frame capture CPU 160 may make this determination in real-time after assessing that sensor feedback information 270 matches image data conditions set forth in request 250C. At that point, frame capture CPU 160 generates trigger 280 to camera 176 which in turn captures a frame or a sequence of frames at a frame rate established in trigger 280, and/or at a time at which a suitable sharpness metric is predicted based on the monitored sensor data.

In yet another non-limiting example, multiple frame clients 210 may request image frames 250 simultaneously, or at a similar time. In some embodiments, frame capture CPU 160 may coalesce the multiple requests to optimize frame capture for the multiple clients. For example, a suitable sharpness metric and/or frame rate may be determined in accordance with the combination of requesting clients, and the trigger 280 may be established accordingly. For example, sensor data may be monitored for a condition which results in the highest sharpness metric among the needs of the requesting clients. As another example, a frame rate may be selected based on the sensor data at which a sharpness of the resulting images is predicted to provide a suitable level of blur (or lack of blur) for the clients.

Once image frames 250 are captured, camera 176 sends a communication 290 that includes image frames 250 to specific clients out of frame clients 210. Camera 176 may send image frames 250 to a frame buffer 260 available to all clients out of the frame clients 210.

Figure 3:
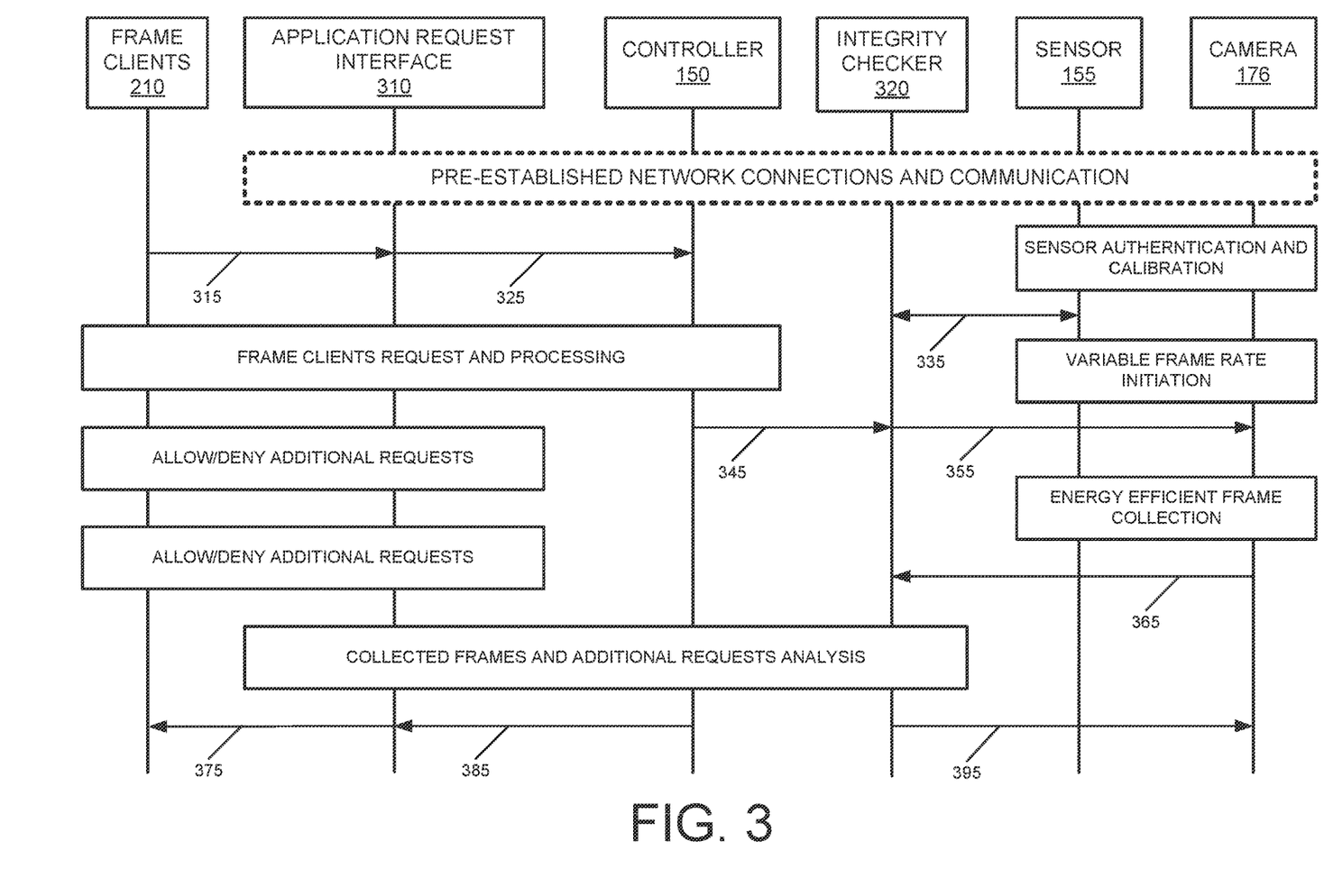
FIG. 3 shows, in flow diagram form, a technique for triggering a frame capture in accordance with one or more embodiments.

FIG. 3 illustrates a flow diagram detailing communication exchanges for triggering a frame capture system 200 in accordance with one or more embodiments. At an initial state, the elements described with respect to FIG. 3 are communicably connected within the frame capture system 200, such as across a bus as part of an electronic device, and/or as part of a communication network including the pre-established network connections and communications shown as a dotted square at the top of the flow diagram. At any point, a communication 315 may occur from frame clients 210 to an application request interface 310, which provides a process for multiplexing and prioritizing requests from frame clients 210 in frame capture CPU 160. In communication 325, application request interface 310 may send a request for frame capture to controller 150 over a predefined time period. In subsequent time periods, frame client requests may be sorted and prioritized to controller 150.

Further, sensor 155 and camera 176 may establish sensor feedback information 270 through their corresponding authentication and calibration in the frame capture system 200. Once sensor feedback information 270 is established, communication 335 may provide an availability information to an integrity checker 320. Integrity checker 320 may perform information verification and validation to ensure that any requests received may be fulfilled by camera 176 in the environment. Integrity checker 320 may be included in frame capture CPU 160.

At this stage, controller 150 may start processing of an authentication event (i.e., start authentication event processing) through communication 345. Integrity checker 320 may approve the requests from frame clients 210 and generate a communication 355 which triggers frame capture in accordance with a selected frame rate. The selected frame rate is defined by the requests from frame clients 210 and to improve power consumption in the frame capture system 200. Once image frames 250 are captured, they may be transmitted in bundled packets or individual packets in communication 365 from camera 176 to integrity checker 320.

In the meantime, and while controller 150 starts processing the authentication event through communication 345, frame clients 210 and application request interface 310 may continue to allow and/or deny additional requests. At the point in which image frames 250 are transmitted to integrity checker 320, integrity checker 320 communicates with frame clients 210, controller 150, and application request interface 310 to determine a destination for image frames 250 and any allowed additional requests. Once the collected frames are analyzed, communications 375 and 385 may be transferred to deliver image frames 250 to specific frame clients 210. Further, once the additional requests are analyzed, communication 395 may be transferred to trigger additional frame collections.

While FIGS. 1-3 show various configurations of components, other configurations may be used without departing from the scope of the disclosure. For example, various components in FIGS. 1-3 may be combined to create a single component. As another example, the functionality performed by a single component may be performed by two or more components.

Figure 4:
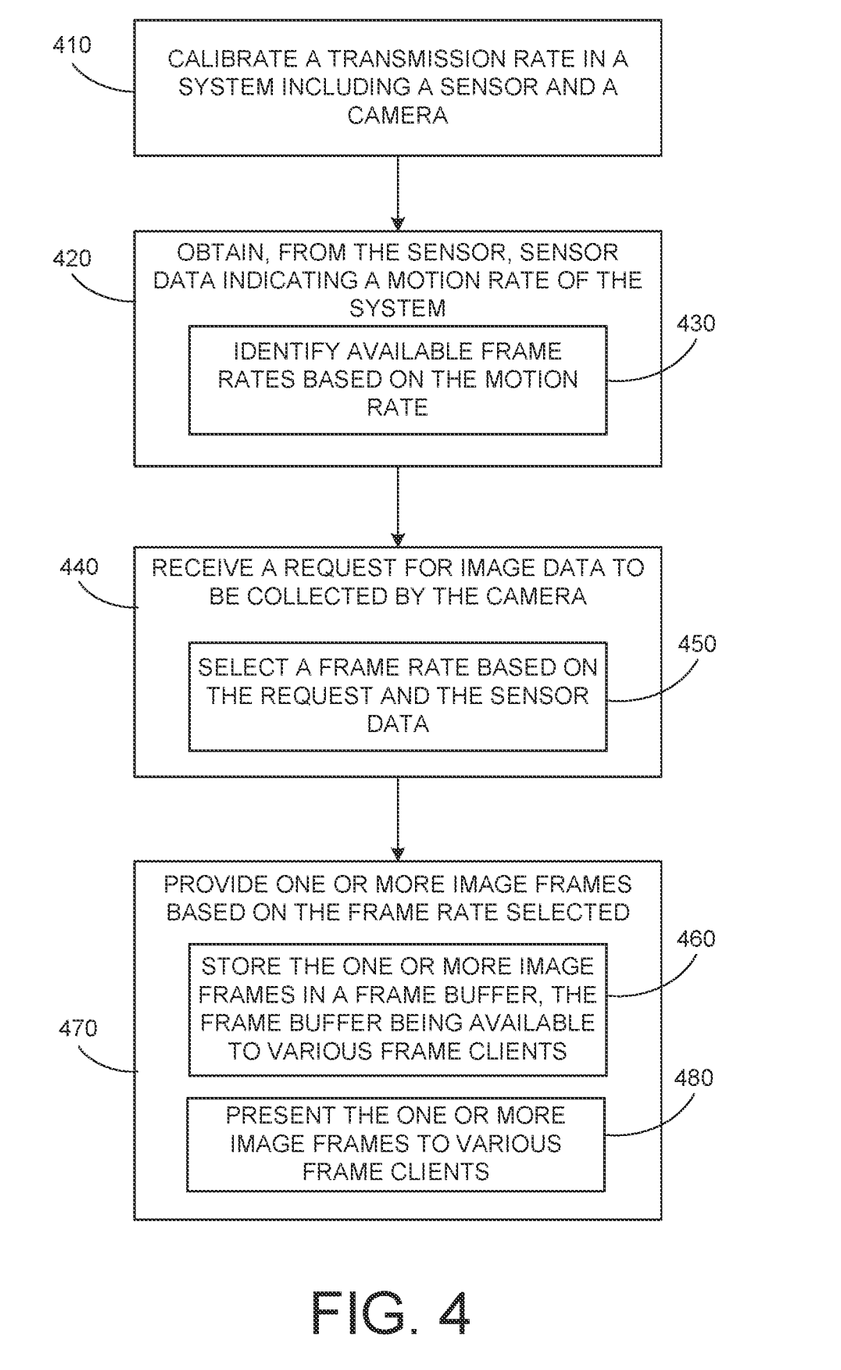
FIG. 4 shows, in flow chart form, an example technique for providing one or more image frames in accordance with one or more embodiments.
Figure 5:
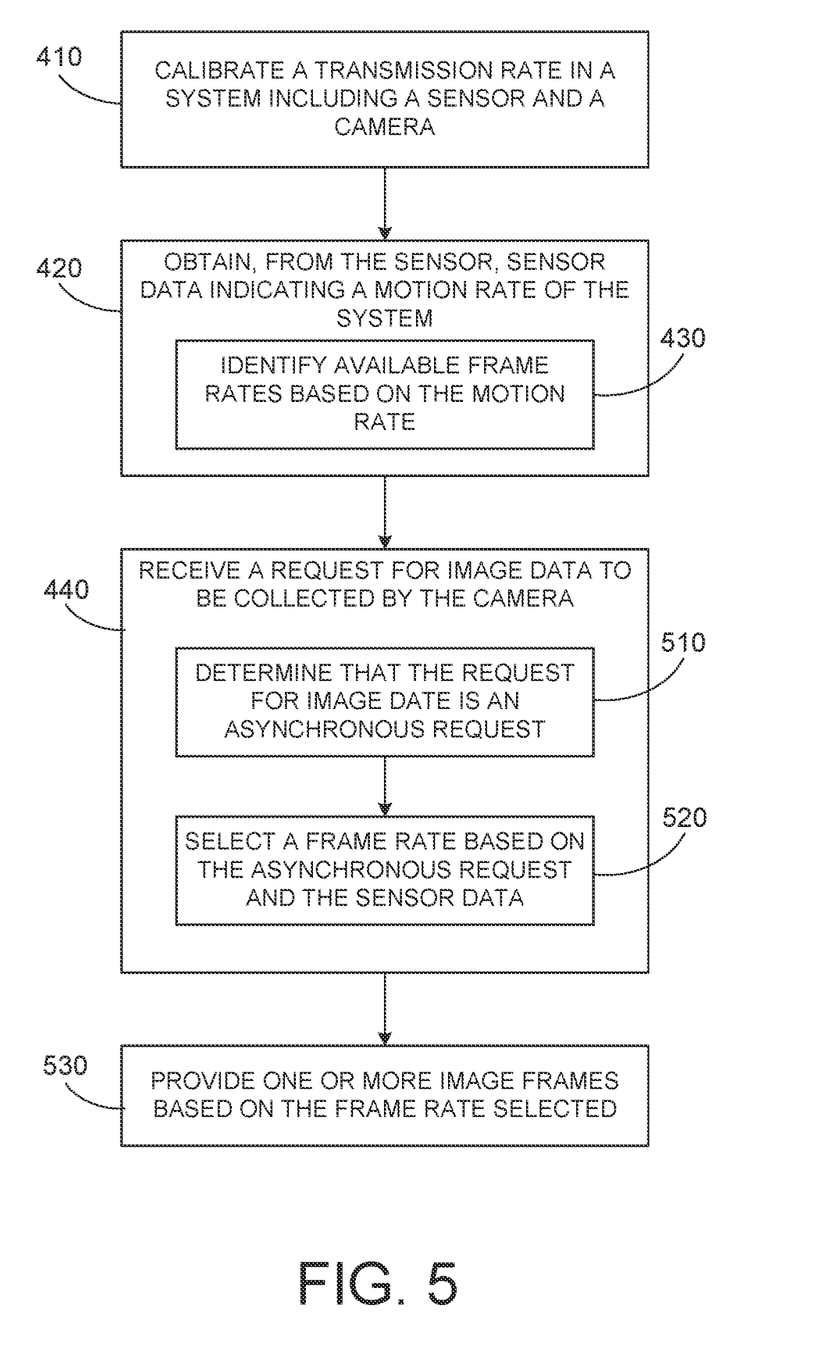
FIG. 5 shows, in flow chart form, an example technique for providing one or more image frames in accordance with one or more embodiments.

FIGS. 4 and 5 show, in flow chart form, methods for triggering a frame capture at a selected frame rate. For purposes of explanation, the following steps will be described in the context of FIGS. 1 and 2. However, it should be understood that the various actions may be taken by alternate components. In addition, the various actions may be performed in a different order. Further, some actions may be performed simultaneously, and some may not be required, or others may be added.

The flowchart begins at 410, and tracking system 100 calibrates a transmission data rate in preparation to identify a motion event. As an example, motion sensor 140 may detect such motion as acceleration, direction of movement, and the like. In one or more embodiments, the motion event may be detected when a change in inertia indicates that the sensor data from motion sensor 140 indicates a change in inertia. Motion may be detected, for example, when the depth information from depth sensor 178 indicates a sudden change in depth from a calibration point. Accordingly, as will be described in greater detail below, a detected motion event may not be a true motion event. For purposes of this flowchart, the detected motion event is considered a true touch event.

The flowchart continues at 420, where sensor data is obtained indicating a motion rate of the system. The motion rate is a representation of the movement of motion sensor 140 over a period of time. If the motion rate is equal to zero, then the motion rate may indicate that movement was not detected. While an object is in motion, the motion rate may indicate that motion is constant and sudden changes in the motion rate may indicate abrupt stops or acceleration increases. In one or more embodiments, the detection of the motion event indicates that requests for frame captures may be controlled to wait for a sudden movement to pass. Said another way, in some embodiments, the system monitors the sensor data to determine when the motion is sufficiently slow as to produce image data satisfying a sharpness threshold. At 430, available frame rates are identified based on the motion rate. In some embodiments, the motion rate may indicate that image frames 250 will not be captured, or that image frames 250 will be captured at variable rates. For example, if the motion rate indicates that movement is high or that it has increased significantly, the available frame rates for capture may be lower to avoid a prolonged collection of blurred images.

The flowchart continues at 440 where camera 176 receives a request for image data to be collected. The image data may include a frame request at the identified available frame rates. At 450, one of the available frame rates is selected based on the request and the sensor data. In some embodiments, the motion sensor data may indicate that image frames 250 will be captured at a rate that meets the specifics of the request and is allowed according to sensor data. For example, if sensor 155 identifies that camera 176 is moving at high speeds (e.g., while riding a bicycle), controller 150 may determine a low frame rate to allow for fewer images to be collected until the car slows down. Further, for a motion-tracking client, a frame rate may be directly proportional to the speed of the movement. For example, a motion tracking algorithm may require overlapping features between successive frames to perform tracking techniques. As such, the motion sensor data may indicate a higher or lower frame rate is required based on a service for which the image data is requested.

The flowchart concludes at 470 where camera 176 collects and provides multiple image frames based on the frame rate selected. At 460, image frames 250 may be stored in a frame buffer available to all frame clients 210. At 470, image frames 250 may be selected and presented to frame clients 210 that provided an image request. The specific image type may be at least one of image frames 250 that meets a predetermined criterion. The predetermined criterion may be one or more parameters that define a clarity of a collected frame. As such, the collection of captured images is available for selection based on required characteristics from the clients. At 480, image frames 250 may be available to all frame clients 210 to further reduce collection times if two or more frame clients 210 request image data that may be included in a single frame. Accordingly, regardless of the number of clients submitting frame requests, the controller may capture a single set of frames to be made available to the requesting clients, thereby managing fulfilment of multiple image requests for various services in an optimized manner.

Referring now to FIG. 5, the flowchart is presented describing a technique for triggering an asynchronous frame collection request irrespective of the latest frame rate selected. The asynchronous frame collection may be a collection of a frame that occurs irrespective of a selected frame rate. An asynchronous frame capture is a frame capture that is not delayed to be stored in the frame buffer.

The flowchart begins at 410 and continues at 420, 430, and 440 in the manner described in reference to FIG. 4.

The flowchart continues at 510, where the request is determined to be an asynchronous request. At 520, a frame rate is selected based on the asynchronous request and the sensor data. In some embodiments, the sensor data may indicate that image frames 250 will be captured at a frame rate that meets the specifics of the asynchronous request and is allowed according to sensor data. At 530, the asynchronous request may not be delayed to store any collected frames into a frame buffer. As a result, all collected frames are provided to the specific frame client upon collection at the selected frame rate.

Figure 6:
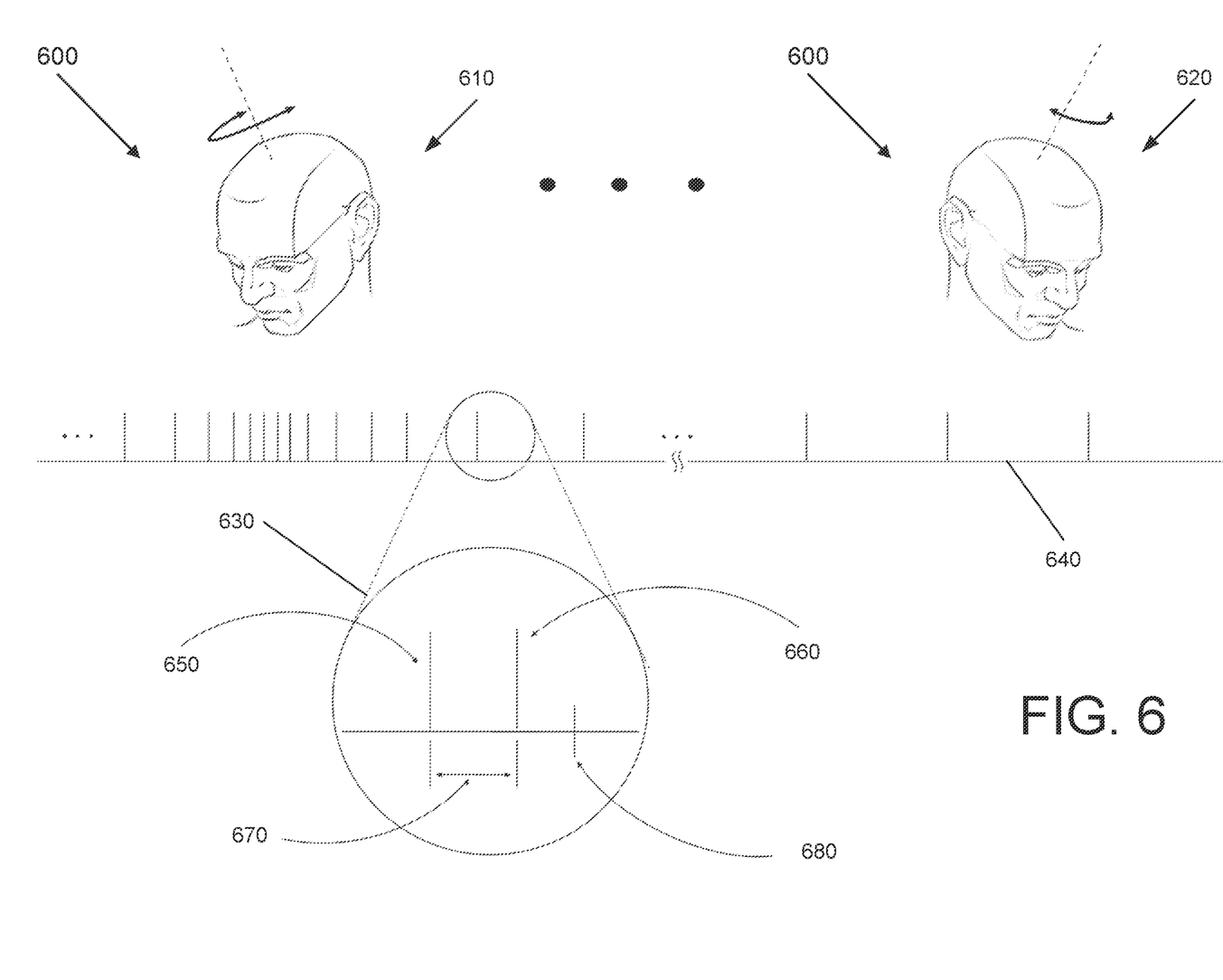
FIG. 6 shows an example technique for capturing an image frame in accordance with one or more embodiments.

FIG. 6 shows an example of a frame rates being varied based on the movement speed of the device. In this case, reference head 600 may be wearing a device that includes a sensor similar to motion sensor 140. In scenario 610, reference head 600 rotates at a fast speed. In scenario 620, reference head 600 rotates at a low speed. Assuming that an image data request is made from a same frame client in both instances, timeline 640 shows that when faster movement is performed is performed by reference head 600, the frame rate associated to the frame collection is increased to increase a predicted sharpness for the images collected. Similarly, timeline 640 shows that when slower movement is performed by reference head 600, the frame rate associated to the frame collection is reduced because the reduced frame rate does not affect the sharpness for the images collected.

In the close-up example 630, a request is made at a time 650. In this case, reference head 600 has slowed down and a lower frame rate is selected for frame capture. As a result, the system allows for a delay 670 to occur before a frame is collected at delayed time 660 before an expiration of the request occurs at expiration time 680. The delay 670 may be a time required to allow the motion of the system falls below a threshold. In this case, the threshold may be a predetermined threshold or value that indicates a motion rate that allows a collected frame to meet a predetermined criterion, for example with respect to blur, sharpness, or other characteristic pertinent to the requesting service.

Figure 7:
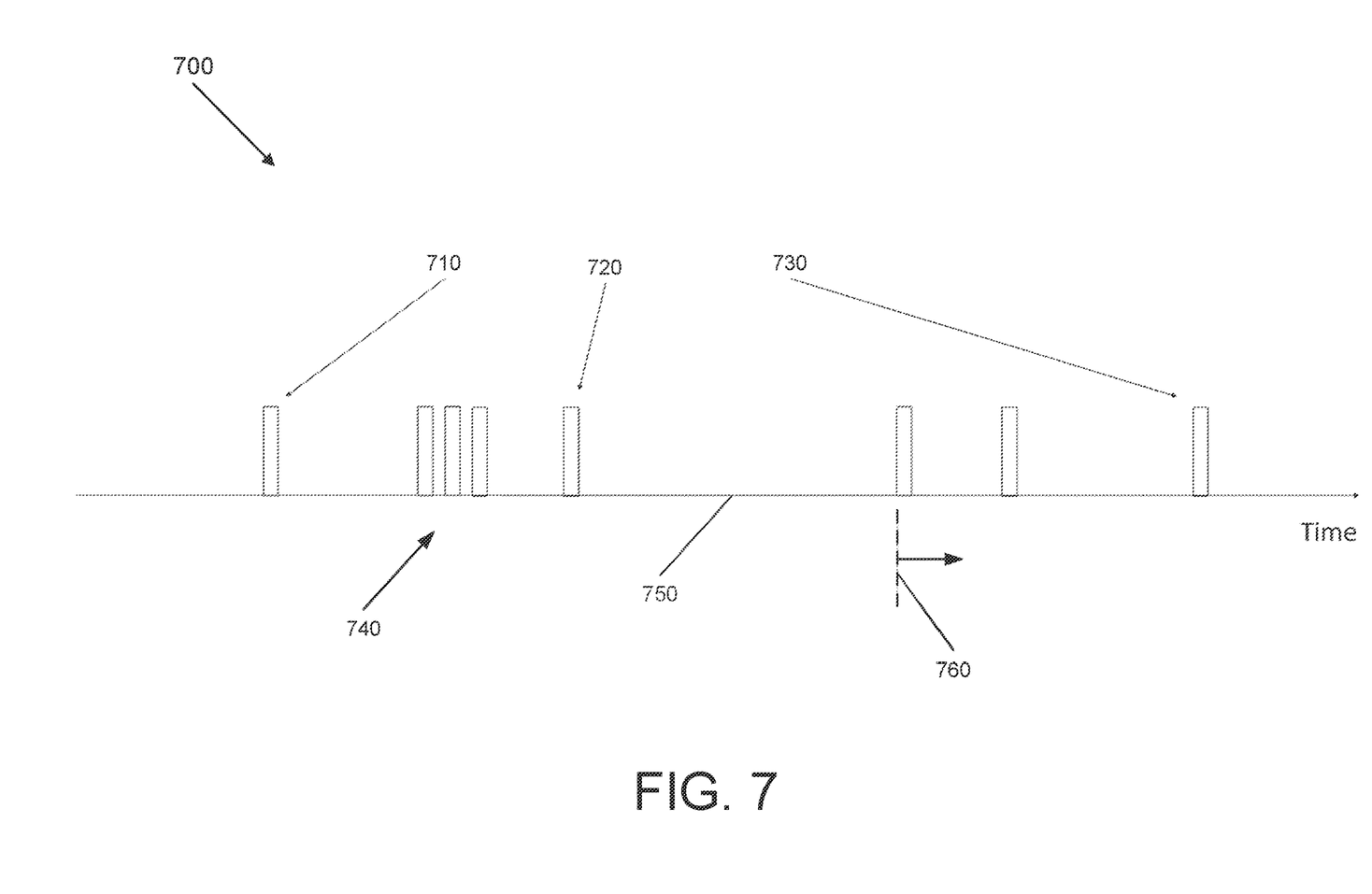
FIG. 7 shows an example technique for capturing an image frame in accordance with one or more embodiments.

FIG. 7 shows an example 700 of asynchronous image captures 710, 720, and 730 over a timeline 750. In FIG. 7, requests may be received by the system to initiate frame capture. As the requests arrive, a frame rate 740 is selected after asynchronous frame capture 710 has been triggered. In this case, the asynchronous frame capture 710 lasts for a period of time. At this point, in accordance with a determination that the asynchronous frame capture 710 has ceased, the camera may enter a low power state. A low power state may indicate that the camera is idle or otherwise consumes less power than during the image capture event. Frame rate 740 restarts frame collection and this rate is maintained until asynchronous frame capture 720 is triggered. After asynchronous frame capture 720, example 700 does not receive any frame capture requests until a point 760 in which a new frame rate is implemented. As shown by asynchronous frame capture 730, frame capture may occur at any time among other frame rates, to minimize power consumption. In some embodiments, in accordance with a determination that the sampling of image frames has ceased, camera 176 may be triggered again to enter the low power state.

Figure 8:
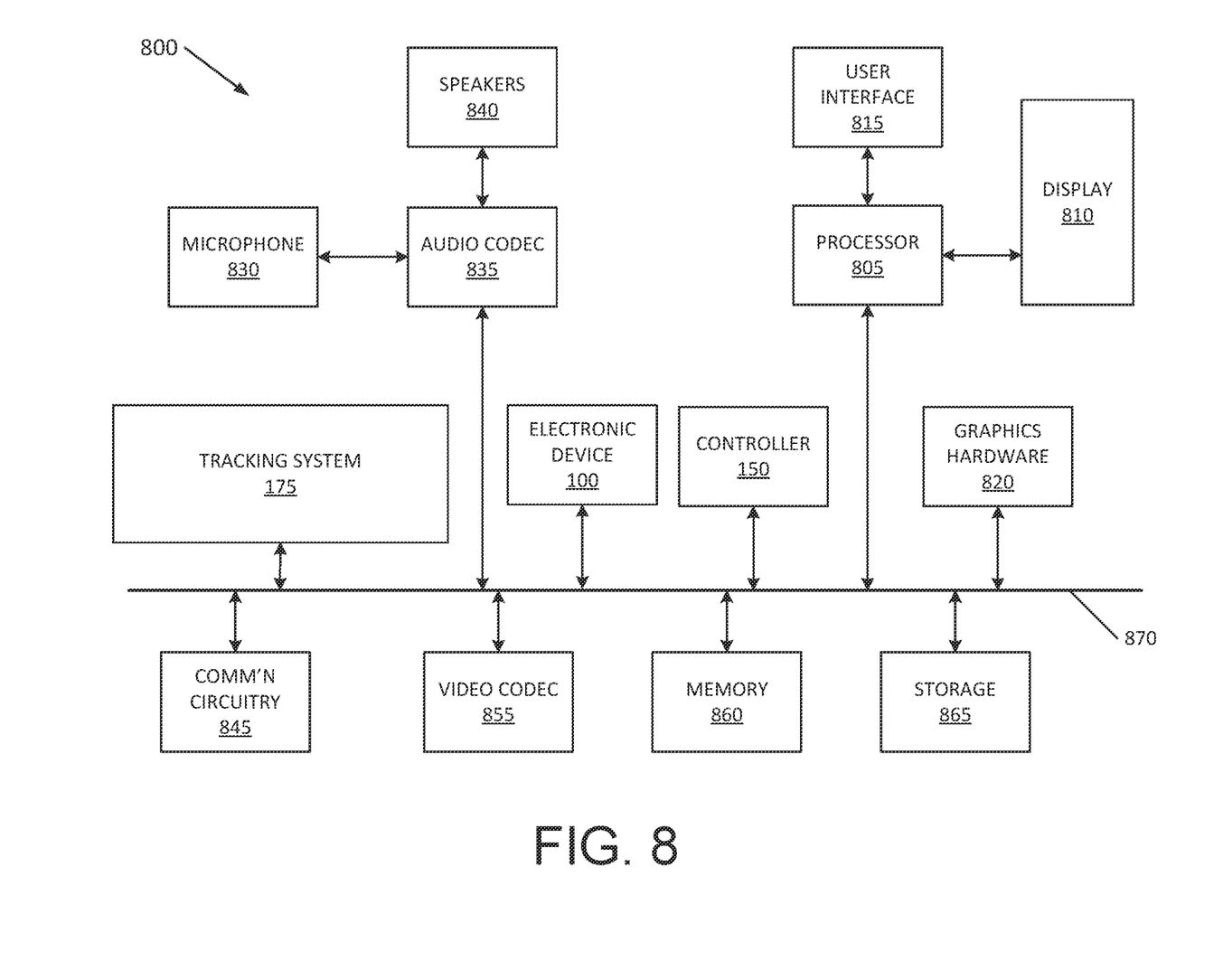
FIG. 8 shows, in flow chart form, an example technique for providing one or more image frames in accordance with one or more embodiments.

Referring now to FIG. 8, a simplified functional block diagram of illustrative multifunction electronic device 800 is shown according to one embodiment. For example, tracking system 100 may include one or more multifunctional electronic devices or may have some or all the described components of a multifunctional electronic device described herein. Multifunction electronic device 800 may include processor 805, display 810, user interface 815, graphics hardware 820, device sensors (e.g., proximity sensor/ambient light sensor, accelerometer and/or gyroscope), microphone 830, audio codec(s) 835, speaker(s) 840, communications circuitry 845, tracking system 175 (e.g., including camera 176 or a camera system) video codec(s) 855 (e.g., in support of digital image capture unit), memory 860, storage 865, and communications bus 870. Multifunction electronic device 800 may be, for example, a digital camera or a personal electronic device such as a personal digital assistant (PDA), personal music player, mobile telephone, or a tablet computer.

Processor 805 may execute instructions necessary to carry out or control the operation of many functions performed by multifunction electronic device 800 (e.g., such as the generation and/or processing of images as disclosed herein). Processor 805 may, for instance, drive display 810 and receive user input from user interface 815. User interface 815 may allow a user to interact with multifunction electronic device 800. For example, user interface 815 can take a variety of forms, such as a button, keypad, dial, a click wheel, keyboard, display screen and/or a touch screen. Processor 805 may also, for example, be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable GPU.

In one or more embodiments, tracking system 100 may include two (or more) lens assemblies, where each lens assembly may have a separate focal length. For example, one lens assembly may have a short focal length relative to the focal length of another lens assembly. Each lens assembly may have a separate associated sensor element. Alternatively, two or more lens assemblies may share a common sensor element. Tracking system 100 may capture still and/or video images. Output from tracking system 100 may be processed, at least in part, by video codec(s) 855 and/or processor 805 and/or graphics hardware 820. Images so captured may be stored in memory 860 and/or storage 865.

Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image, and video files), computer program instructions or software, preference information, device profile information, and any other suitable data. Storage 865 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805 such computer program code may implement one or more of the methods described herein.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A system comprising:
   a camera affixed in a wearable device and configured for collecting image data of an environment;
   at least one sensor of the wearable device operably connected to the camera and configured to capture motion data; and
   a controller communicably coupled to the camera and the at least one sensor and configured to:
   collect, by the at least one sensor, sensor data indicating a motion rate of the wearable device in the environment, and
   in response to detecting a trigger for collection of image frames from one or more client applications:
   determine an image capture criterion based on the one or more requesting client applications,
   determine, based on the motion rate, a supported frame rate, and initiate frame capture by the camera in response to a determination that the supported frame rate satisfies the image capture criterion.

2. The system of claim 1, the controller further configured to:
obtain, from the one or more requesting client applications, the request for image data,
trigger the frame capture in accordance with the request for image data obtained from the one or more requesting client applications.

3. The system of claim 1,
wherein the one or more requesting client applications comprises a plurality of requesting client applications, and
wherein the frame capture is triggered in accordance with a combination of the plurality of requesting client applications.

4. The system of claim 3, wherein the controller is further configured to:
receive image frames from the camera; and
store the image frames in a frame buffer, wherein the frame buffer is available to the plurality of requesting client applications.

5. The system of claim 4,
wherein the controller is further configured to, when one requesting client application request out of the plurality of requesting client applications requests an asynchronous request for image data, trigger an asynchronous frame capture in addition to the frame capture, and
wherein the asynchronous frame capture is a frame capture type that is not delayed to be stored in the frame buffer.

6. The system of claim 1,
wherein the controller is further configured to trigger the frame capture by detecting, based on a motion parameter in the sensor data, that a motion of the system falls below a predetermined threshold, and
wherein the frame capture is triggered in accordance with the detection.

7. The system of claim 1,
wherein the frame capture comprises capturing frames from the camera over a period of time, and
wherein the controller is further configured to, in accordance with a determination that the frame capture has ceased, trigger the camera to enter a low power state.

8. A system comprising:
a camera affixed in a wearable device and configured for collecting image data of an environment;
at least one sensor of the wearable device operably connected to the camera; and
a controller communicably coupled to the camera and the at least one sensor and configured to:
cause at least one sensor to collect sensor data indicating a motion rate of the wearable device in the environment, and
in response to detecting a trigger for collection of image frames from one or more requesting client applications:
select a frame rate based on one or more requesting client applications and the sensor data,
trigger a high power mode of the wearable device to initiate frame capture by the camera in response to the sensor data indicating the motion rate of the wearable device falls below a predetermined threshold, wherein the predetermined threshold is associated with the frame rate, and
capture image data at the selected frame rate.

9. The system of claim 8, the controller further configured to:
obtain, from the one or more requesting client applications, the request for image data,
trigger the frame capture in accordance with the request for image data obtained from the one or more requesting client applications.

10. The system of claim 8,
wherein the one or more requesting client applications comprises a plurality of requesting client applications, and
wherein the frame capture is triggered in accordance with a combination of the plurality of requesting client applications.

11. The system of claim 10, wherein the controller is further configured to:
receive image frames from the camera; and
store the image frames in a frame buffer, wherein the frame buffer is available to the plurality of requesting client applications.

12. The system of claim 11,
wherein the controller is further configured to, when one requesting client application out of the plurality of requesting client applications requests an asynchronous request for image data, trigger an asynchronous frame capture in addition to the frame capture, and
wherein the asynchronous frame capture is a frame capture type that is not delayed to be stored in the frame buffer.

13. The system of claim 8,
wherein the frame capture comprises capturing frames from the camera over a period of time, and
wherein the controller is further configured to, in accordance with a determination that the frame capture has ceased, trigger the camera to enter a low power state.

14. The system of claim 8, wherein the predetermined threshold corresponds to a motion measurement at which the selected frame rate produces an image satisfying a predetermined sharpness metric.

15. A non-transitory computer readable medium comprising instructions that, when executed by at least one computer processor, cause the at least one computer processor to:
cause at least one sensor to collect sensor data indicating a motion rate of a wearable device in an environment, and
in response to detecting a trigger for collection of image frames from one or more requesting client applications:
select a frame rate based on one or more requesting client applications and the sensor data,
trigger a high power mode of the wearable device to initiate frame capture by a camera in response to the sensor data indicating the motion rate of the wearable device falls below a predetermined threshold, wherein the predetermined threshold is associated with the frame rate, and
capture image data at the selected frame rate.

16. The non-transitory computer readable medium of claim 15, wherein the at least one computer processor is further caused to:
obtain, from the one or more requesting client applications, a request for image data,
trigger the frame capture in accordance with the request for image data obtained from the one or more requesting client applications.

17. The non-transitory computer readable medium of claim 15, wherein the one or more requesting client applications comprises a plurality of requesting client applications, and wherein the frame capture is triggered in accordance with a combination of the plurality of requesting client applications.

18. The non-transitory computer readable medium of claim 17, wherein the at least one computer processor is further caused to:

receive image frames from the camera; and store the image frames in a frame buffer, wherein the frame buffer is available to the plurality of requesting client applications.

19. The non-transitory computer readable medium of claim 18, wherein the processor is further configured to, when one requesting client application request out of the plurality of requesting client applications requests an asynchronous request for image data, trigger an asynchronous frame capture in addition to the frame capture, and wherein the asynchronous frame capture is a frame capture type that is not delayed to be stored in the frame buffer.

20. The non-transitory computer readable medium of claim 15, wherein the frame capture comprises capturing frames from the camera over a period of time, and wherein the processor is further configured to, in accordance with a determination that the frame capture has ceased, trigger the camera to enter a low power state.

* * * * *